(12) United States Patent
Brendle

(10) Patent No.: US 6,820,114 B2
(45) Date of Patent: Nov. 16, 2004

(54) IDENTIFYING OBJECT SUPPLIERS IN A NETWORK

(75) Inventor: Rainer Brendle, Neckargemund (DE)

(73) Assignee: SAP Aktiengesellschaft, Waldorf (*) Notice: Subject to any disclaimer, the term of this patent is extended or adjusted under 35 U.S.C. 154(b) by 202 days.

(21) Appl. No.: 10/259,996

(22) Filed: Sep. 27, 2002

(65) Prior Publication Data

US 2003/0061565 A1 Mar. 27, 2003

(30) Foreign Application Priority Data

Sep. 27, 2001 (EP) .............................................. 01123095
Sep. 27, 2001 (EP) .............................................. 01123128

(51) Int. Cl.[7] ............................................ G06F 15/167
(52) U.S. Cl. ...................... 709/213; 709/201; 709/214; 709/216
(58) Field of Search ................................. 709/201, 203, 709/213, 214, 215, 216, 223, 226, 248

(56) References Cited

U.S. PATENT DOCUMENTS 6,098,079 A * 8/2000 Howard ...................... 707/205
6,609,136 B2 * 8/2003 Bamford et al. ............ 707/202

* cited by examiner

Primary Examiner—Gary Portka
(74) Attorney, Agent, or Firm—Fish & Richardson P.C.

(57) ABSTRACT

A method includes providing a first journal and first digest matrix in a first computer, a second journal and second digest matrix in the second computer, the second journal entry indicating a previous modification of an object on a third computer, sending a representation of a previous latest second journal entry, comparing the representation with a comparable portion of the second journal, if a current latest second journal entry referring to the third computer is newer than the previous latest second journal entry, transmitting from the second journal to the first journal the second journal entry that is newer than the previous latest second journal entry, adjusting a cache in the first computer according to the first journal, updating the representation, receiving a request for an object, and identifying via the first digest matrix the second computer as a supplier of the object.

17 Claims, 12 Drawing Sheets

IDENTIFYING OBJECT SUPPLIERS IN A NETWORK

CLAIM FOR PRIORITY UNDER 35 U.S.C. §119

A claim for priority is made under the provisions of 35 U.S.C. §119 for the present U.S. patent application based upon European Patent Application Ser. No. EP 01123128.9, filed on Sep. 27, 2001, and European Patent Application Ser. No. EP 01123095.0, filed on Sep. 27, 2001.

TECHNICAL FIELD

This invention relates to data processing by digital computer.

BACKGROUND

The terms client and server refer to a relationship between two computer programs in which one program, a client, makes a service request from another program, a server, which fulfills the request. In a network, the client/server model provides a convenient way to interconnect programs that are distributed efficiently across different locations. The client/server model has become one of the central ideas of network computing. In a typical client/server model, one server is activated and awaits client requests. Typically, multiple client programs share the services of a common server program. Both client programs and server programs are often part of a larger program or application.

Application users using client systems often access a database server. Each client system accesses an application server. An application server accesses the database server. Application servers handle application logic, thus taking away load from the database server. By increasing the number of application servers, a number of users can work on the same database system, because the load is balanced between the database system and all application servers. The application servers store copies of original database objects in a buffer area (also referred to as a cache) of their memories to reduce the number of accesses to the original database objects.

SUMMARY

In an aspect, the invention features a computer-implemented method involving a first computer having a cache and at least a second computer, the method including providing a first journal on the first computer, a second journal on the second computer, a first digest matrix of the first computer and a second digest matrix of the second computer, wherein at least one second journal entry indicates a previous modification of an object on a third computer, sending from the first computer to the second computer at least a representation of a previous latest second journal entry referring to the third computer, comparing the at least one representation with a comparable portion of the second journal, if a current latest second journal entry referring to the third computer is newer than the previous latest second journal entry, transmitting from the second journal to the first journal at least each second journal entry that is newer than the previous latest second journal entry and that refers to the third computer, adjusting the cache according to the first journal, updating the at least one representation on the first computer according to the first journal, receiving a request for an object on the first computer, and identifying via the first digest matrix the second computer as a supplier of the object.

The invention can be implemented to include one or more of the following advantageous features. Sending can include delivering the request for the object from the first computer to the second computer. The second computer can use a further cache and transmitting further can include sending the object from the further cache to the cache of the first computer. Updating can include the first digest matrix. The method can include synchronizing the first digest matrix with the second digest matrix.

In another aspect, the invention features a method including in a network of computers, providing a first journal in a first computer, a second journal in the second computer, a first digest matrix of the first computer and a second digest matrix of the second computer, the second journal entry indicating a previous modification of an object on a third computer, sending from the first computer to the second computer a representation of a previous latest second journal entry, comparing the representation with a comparable portion of the second journal, if a current latest second journal entry referring to the third computer is newer than the previous latest second journal entry, transmitting from the second journal to the first journal the second journal entry that is newer than the previous latest second journal entry, adjusting a cache in the first computer according to the first journal, updating the representation on the first computer according to the first journal, receiving a request for an object on the first computer, and identifying via the first digest matrix the second computer as a supplier of the object.

The invention can be implemented to include one or more of the following advantageous features. Sending can include delivering the request for the object from the first computer to the second computer. Updating can include the first digest matrix. The method can include synchronizing the first digest matrix with the second digest matrix.

The invention can be implemented to include one or more of the following advantageous features.

The method takes advantage of the fact that most objects are not needed in an absolutely temporal precise manner but still have to be consistent within a certain time interval. Objects having a static character, such as master data of an application system, can be "buffered" in a cache of a network system because they are rarely changed. The retrieval of an object directly from a corresponding database, which is slower than the retrieval from a cache memory, can be avoided as long as no modification is applied to the object and the buffered copy of the object in the cache is identical with the original object in the database.

In a large computer network, such as the Internet, substantially simultaneous access to an object by a large number of users is achieved by storing buffered copies of the object in the caches of a number of network computers. The method provides a consistent copy of the object at a network system where the object is requested, rather than retrieving the original object from the database each time a user tries to access it.

The method routes an object request to a cache system that stores an appropriate copy of the requested object. The copy is distributed to the requesting system, thus increasing the number of suppliers for the requested object.

A first computer receiving the object request, almost immediately, identifies another second computer that can deliver on the request. This avoids the slower direct database access to the corresponding first computer. It further saves bandwidth in the network because only one other computer is queried, instead of querying a group of other computers.

If a further request for the object is directed to the first computer, the request is instantly answered from the first cache. If the request is directed to a further computer with a further, synchronized digest matrix, there are now two suppliers (first and second computer) to deliver on the request.

The details of one or more particular implementations of the invention are set forth in the accompanying drawings and the description below. Other features, objects, and advantages of the invention will be apparent from the description and drawings, and from the claims.

DETAILED DESCRIPTION

Figure 1A:
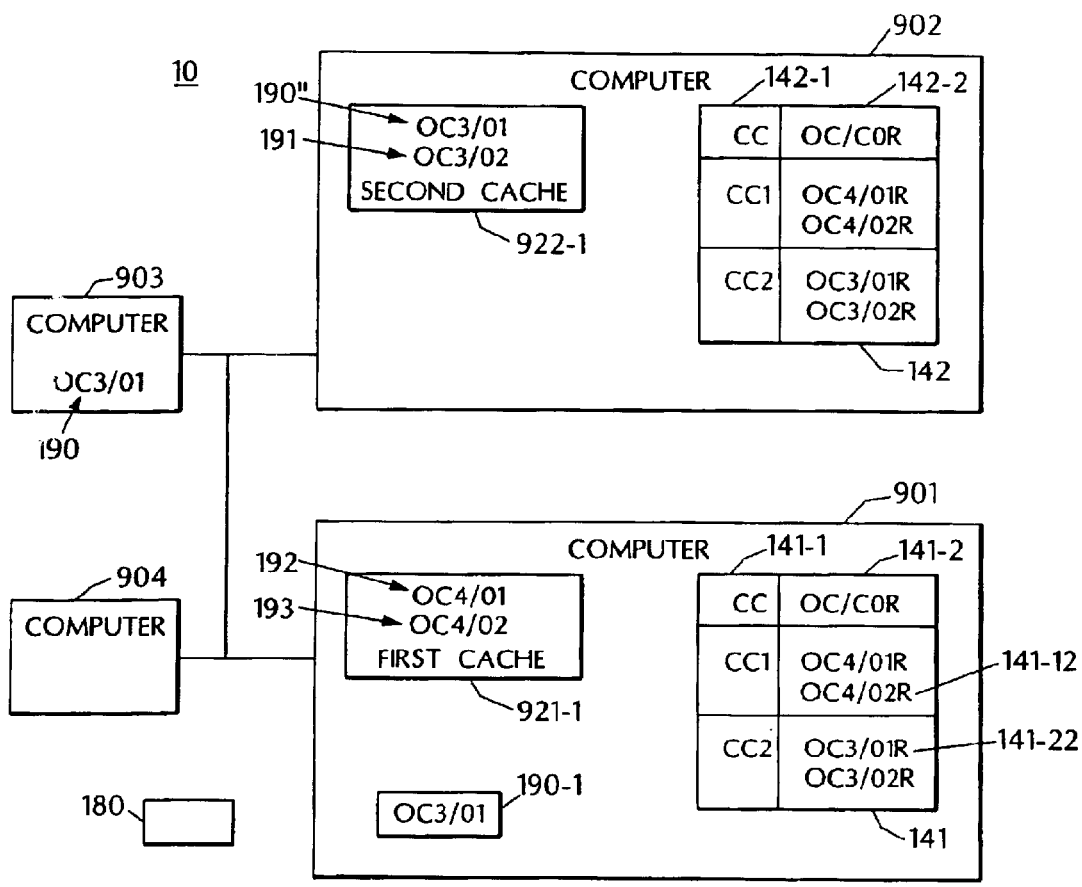
FIGS. 1A and 1B are block diagrams of a network.

The following terms are useful in reading and understanding this detailed description.

An "Object" is a data structure with a specific meaning within a specific context (e.g., tables, files, application objects, web page content, query results). In an example, an object is stored on an origin computer system. Various actions ("A"), such as create ("C"), modify ("M") or delete ("D"), can be applied to the object on the origin computer system. To accelerate access to the object, copies of the object can be stored on multiple computer systems. These copies are often stored in cache memory.

A "valid copy" is a copy of an object that is stored in a cache and is consistent with the original object. If the original object is modified, a corresponding copy becomes obsolete and, therefore, invalid.

An "origin computer system" ("origin computer", "OC") is a computer system, where an original object is stored (e.g., web application, table, etc.). In an example, an origin computer is a computer system having a database.

A "cache computer" ("CC") is a system that stores objects of at least one origin computer system in a cache memory and forwards objects to other systems on request.

A "supplier" or "supplying computer" is a cache computer that stores a copy of a requested object in its cache.

A "requestor" or "requesting computer" is a computer (e.g., client computer, cache computer) that sends a request for an object to a supplier.

A "cache" is a cache memory on a cache computer that stores copies of objects of a corresponding origin computer. A cache computer can have multiple caches.

A "journal" is a data structure that stores journal entries that track a change history of objects on an origin computer. A "journal entry" corresponds to a modification of an object on the origin computer. In an example, the journal exists on a cache computer and all journal entries referring to a specific origin computer include a relative time stamp indicating a temporal order of corresponding object modifications.

A "Universal Sequence Number" ("USN") is a number or numbers that are generated as increasing (or decreasing) in value over time. In an example, USNs are integers. With each modification of an object in an origin computer, a corresponding journal entry is generated with a new USN on a corresponding cache computer. A journal entry with a higher absolute USN value for a specific origin computer is generated later than a journal entry with a lower absolute USN value for a single origin computer. A journal entry having a highest absolute USN value for a given origin computer is referred to as "the latest journal entry referring to the origin computer".

"Synchronization" is used to refer to any process making at least a part of a first data structure on a first cache computer equal to at least a corresponding part of a second data structure on a second cache computer.

A "synchronization mark" ("S-mark") is a data structure that stores in a first cache computer a representation of a latest journal entry of a second cache computer at a time of a last synchronization between the two cache computers. An S-mark is also the latest journal entry referring to a corresponding origin computer.

A "Synchronization vector" ("S-vector") is a vector that stores in a first cache computer S-marks of all cache computers in a network with respect to the first cache computer.

A "synchronization trigger" ("S-trigger") is a signal used to initiate synchronization of at least two cache computers. For example, an S-trigger can be launched by a time-scheduled event or a request from a first cache computer to a second cache computer.

"Synchronization topology" defines an order of synchronization of multiple cache computers in a network. In an example, a ring-topology is used. Other topologies covering a network can also be used.

A "content digest" ("CD") is a sequence of a group of bit patterns on a cache computer in which each bit pattern is a representation of an object that is stored in a cache of the cache computer.

A "digest matrix" ("D-matrix") is a matrix that is stored in a cache computer and includes for each cache computer in a network, an identification (ID) of the cache computer and a content digest of the cache computer. In an example, the D-matrix of a cache computer is updated with every S-trigger.

"Transmit" and "send" refer to making data available from a first to a second computer. The original data typically remains on the first computer and the second computer receives a copy of the data.

FIG. 1A shows as an illustrative example of a computing installation in which four computers 901, 902, 903, 904 are linked together in network 10. First computer 901 and second computer 902 are cache computers. Third computer 903 and fourth computer 904 are origin computers.

First computer 901 includes a first cache 921-1. In the example, first cache 921-1 stores objects 192 (OC4/01), 193 (OC4/02). For example, objects 192, 193 were previously loaded from fourth computer 904 or from another computer in the network 10 (not shown). A second cache 922-1 in the second computer 902 stores objects 190" (OC3/01), 191 (OC3/02). Object 190" is a cached copy of an original object 190 on third computer 903. For example, objects 190", 191 were previously loaded from third computer 903 or from another computer in the network 10 (not shown).

First computer 901 includes a first digest matrix 141 and second computer 902 includes a second digest matrix 142. By way of example, a data structure of a digest matrix is explained using the first digest matrix 141. First digest matrix 141 includes column 141-1 (CC) and column 141-2 (OC/COR). Column 141-1 stores IDs of cache computers (e.g., 901, 902) of network 10. Column 141-2 stores a content digest of a corresponding cache computer in column 141-1. First digest matrix 141 has a content digest for each cache computer in network 10. Each content digest includes representations of objects that are stored in a cache of a corresponding cache computer. Each object representation is implemented as a bit pattern. For example, the object representations OC3/01R and OC3/02R represent the objects 190" (OC3/01) and 191 (OC3/02) of second computer 902, respectively. The second digest matrix 142 includes columns 142-1 and 142-2 that is equivalent with columns 141-1 and 141-2, respectively.

First computer 901 receives request 190-1 for object 190. A requestor can be any other computer in network 10. Request 190-1 has the format of an object key (e.g., OC3/01).

First computer 901 checks first cache 921-1 for a copy 190' of the object 190. This is achieved by comparing request 190-1 with a comparable portion (e.g., object key) of objects stored in first cache 921-1. If first cache 921-1 has a copy (e.g., 190') of requested object 190, first computer 901 answers the request 190-1 by sending the copy 190' to the requestor.

If first cache 921-1 has no copy (e.g., 190'), first computer 901 sends message 180 to the requestor (not shown) to convey information to the requestor that requested object 190 is not immediately available. First computer 901 identifies second computer 902 as a supplier of copy 190" of the requested object 190. First computer 901 uses digest matrix 141 of first computer 901. In the example, content digest 142 of cache computer 902 includes the object representation OC3/01R of the requested object 190 (OC3/01), indicating that copy 190" is stored in the second cache 922-1 of the second computer 902. A supplier (CC2) for the requested object is now identified.

Having identified second computer 902 as the supplier, first computer 901 forwards request 190-1 to second computer 902 to retrieve copy 190" from second cache 922-1.

Figure 1B:
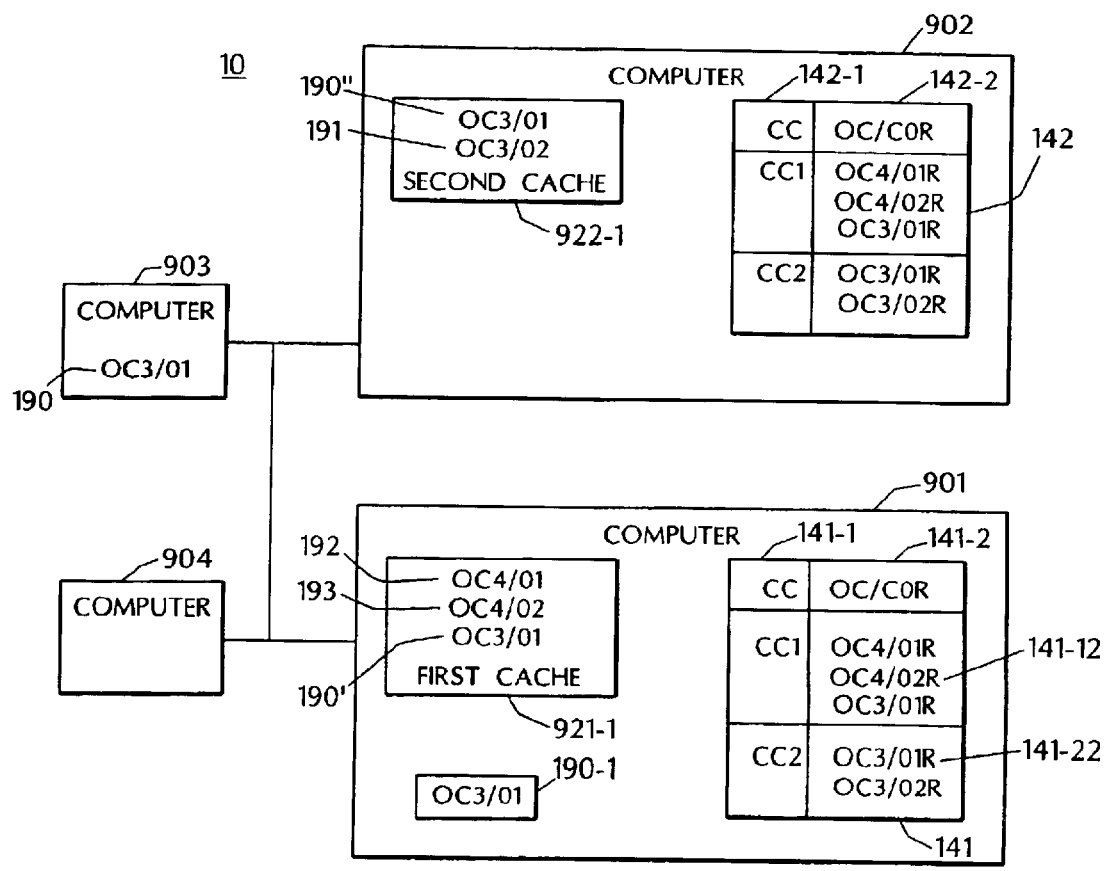

In FIG. 1B, the network 10 is shown after synchronizing second digest matrix 142 with first digest matrix 142. Second computer 902 transmits object 190" from the second cache 922-1 to the first cache 921-1. First computer 901 stores copy 190' in first cache 921-1. First computer 901 updates its content digest 141-22 in first digest matrix 141 by adding an object representation (OC3/01R) for object 190. To inform second computer 902 about the current cache content of first cache 922-1, first computer 901 sends updated first digest matrix 141 to second computer 902. Second computer 902 (CC1) now synchronizes second digest matrix 142 with updated first digest matrix 141.

An advantage here is the availability of the same object 190 (OC3/01) in network 10 in the form of buffered copies 190', 190" on multiple computers 901, 902, respectively. A bottleneck of a single source of data for object 190 in network 10 is removed. Synchronizing the digest matrices of cache computers in network 10 spreads the information about multiple storage locations of an object. An efficient routing of an object request to a supplier of the object by identifying the supplier via a digest matrix is achieved.

Figure 2:
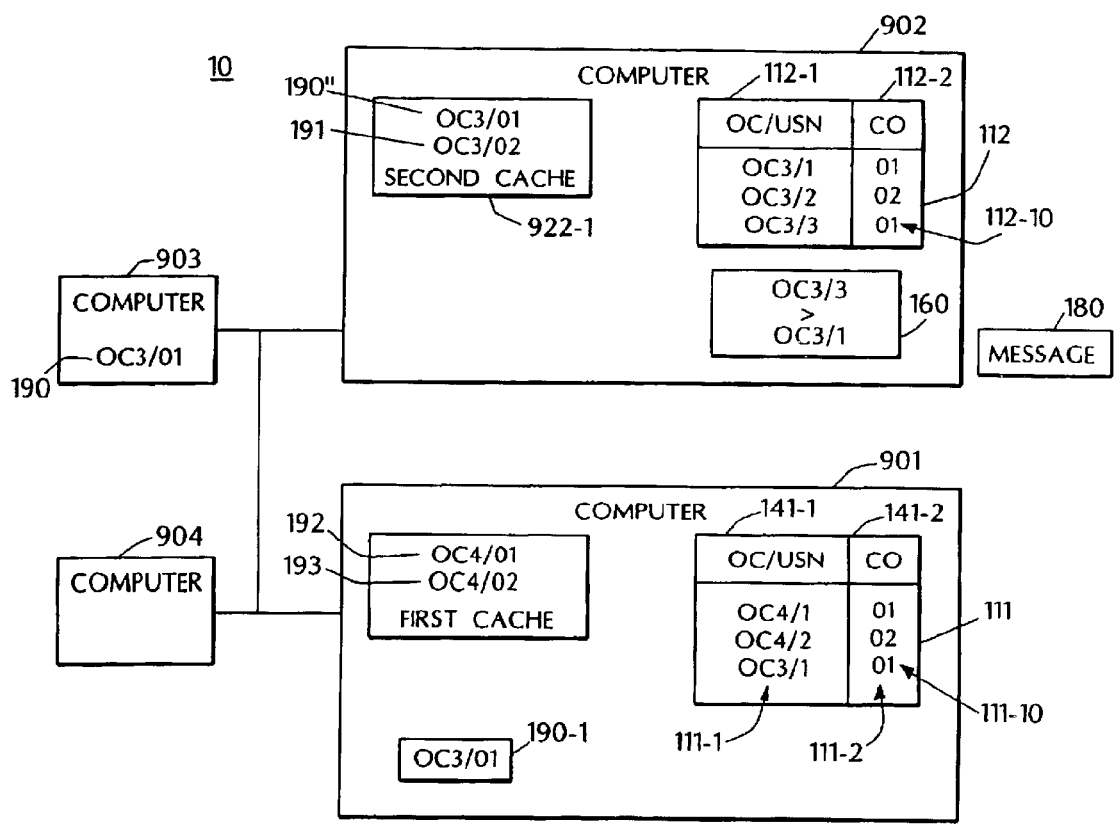
FIG. 2 is a block diagram of a network.

As shown in FIG. 2, the network 10 includes four computers 901, 902, 903, 904. First computer 901 stores first journal 111. First journal 111 includes all journal entries relating to object modifications on fourth computer 904. First journal 111 further stores journal entry 111-10 (OC3/1) that corresponds to a modification of object 190 (OC3/01) on third computer 903. Second computer 902 stores second journal 112. Second journal 112 includes all journal entries relating to third computer 903. Second journal 112 can store additional entries that refer to other origin computers (not shown). The origin computer intermediately stores the journal entries and the computer loads new journal entries of the assigned origin computer at predefined time intervals.

By way of example, a data structure of a journal is explained by using journal entry 112-10 of second journal 112. Journal entry 112-10 refers to third computer 903. Journal entry 112-10 has a key that includes a relative timestamp for the journal entry. That is, the relative timestamp indicates for each journal entry referring to a specific origin computer if the journal entry was generated before or after another journal entry. Therefore, the relative temporary order of the corresponding object modifications on the specific origin computer is known. Journal entry key 112-10 includes an ID of the corresponding origin computer and an USN (e.g., 1). Further, journal entry 112-10 includes an ID (e.g., 01) of the modified object (e.g., 01, 02) in column 112-2. Journal 111 includes columns 111-1 and 111-2 that is functionally equivalent to columns 112-1 and 112-2 of journal 112, respectively.

In the example, an assumption is made that new journal entries (e.g., 112-10) were generated in second journal 112 since the last synchronization occurred between first and second journals 111, 112. First journal entry 111-10 indicates the relative timestamp (OC3/1) of the last synchronization.

When first computer 901 forwards object request 190-1 to second computer 902, information about a relative timestamp for the requested object 190 is also transmitted from first computer 901 to second computer 902. First computer 901 identifies journal entry 111-10 of first journal 111 as the latest, most current journal entry referring to requested object 190.

Comparator 160 of second computer 902 compares the relative timestamps of latest second journal entry 112-10 (referring to requested object 190) and latest first journal entry 111-10. In the example, the relative timestamp of second journal entry 112-10 (OC3/3) was generated later than the relative timestamp of first journal entry 111-10 (OC3/1), which is derived from the higher USN portion (i.e., 3>1) of the journal key. This indicates a high probability, that copy 190" of object 190 stored in second cache 922-1 is still a valid copy, because object 190 was not modified since it was loaded into second cache 922-1. The probability depends on the quality of the journal synchronization among all computers of network 10. To insure a high probability for the validity of a cached object copy, a cache computer deletes obsolete object copies from its cache. For example, obsolete copies in a cache are detected when synchronizing the journal of a computer with the journal of another computer and a journal entry of another computer indicates a modification of a cached object occurred after the caching of the object. Because copy 190" is valid, second cache 922-1 transmits copy 190" to first cache 921-1 to answer request 190-1.

In the event that second computer 902 recognizes that cached copy 190" is invalid (e.g., when the relative timestamp of second journal entry 112-10 was generated earlier than the relative timestamp of first journal entry 111-10), second computer sends message 180 to first computer 901. Message 180 indicates that no valid copy of requested object 190 is available in second cache 922-1. Second computer 902 deletes the invalid copy from its cache. In an example, second computer 902 attempts to identify another supplier of requested object 190 by using second digest matrix 142. In this example, second computer 902 gets the role of first computer 901 and the additional supplier (not shown) gets the role of second computer 902.

Figure 3A:
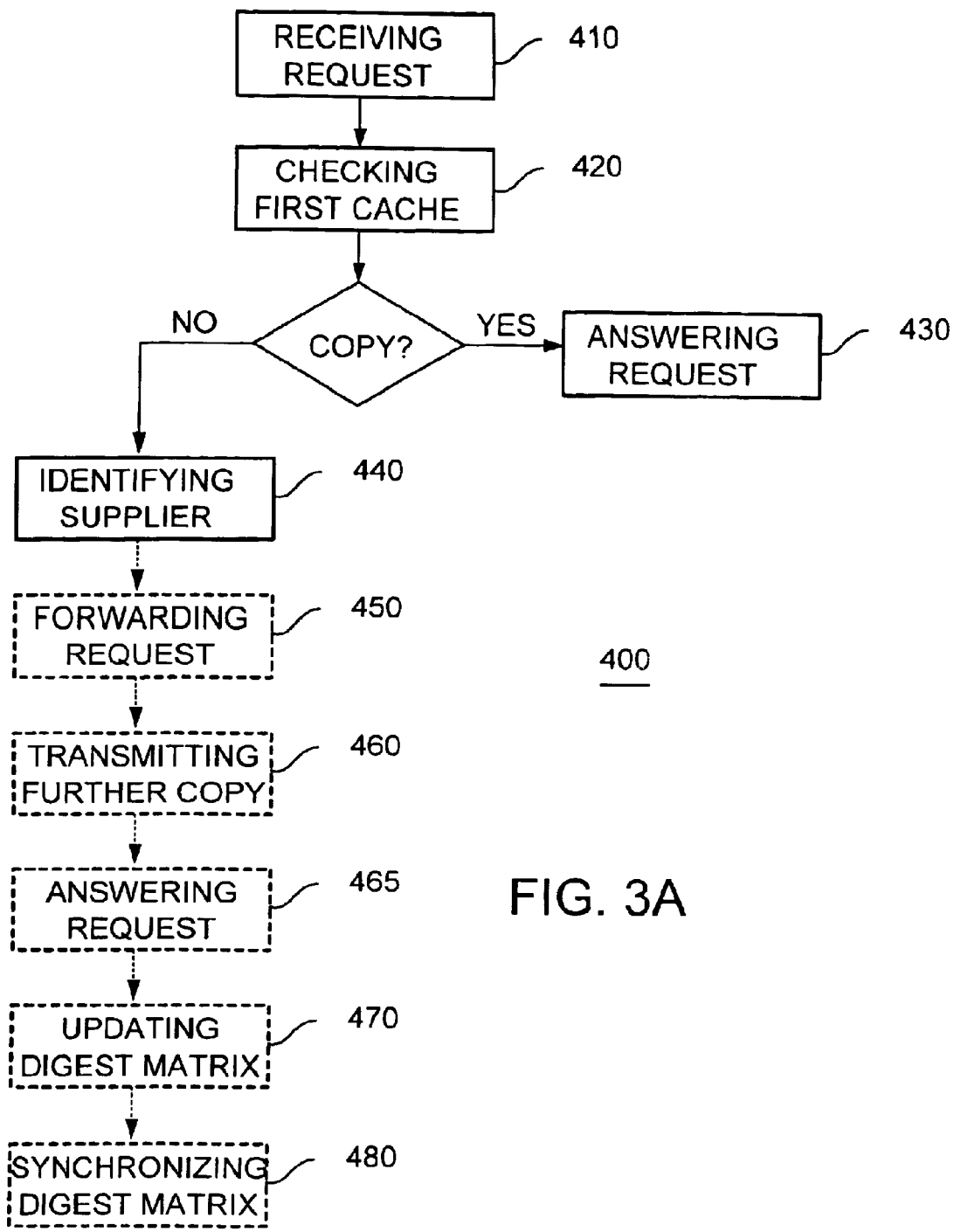
FIGS. 3A, 3B and 3C are flow diagrams.
Figure 3B:
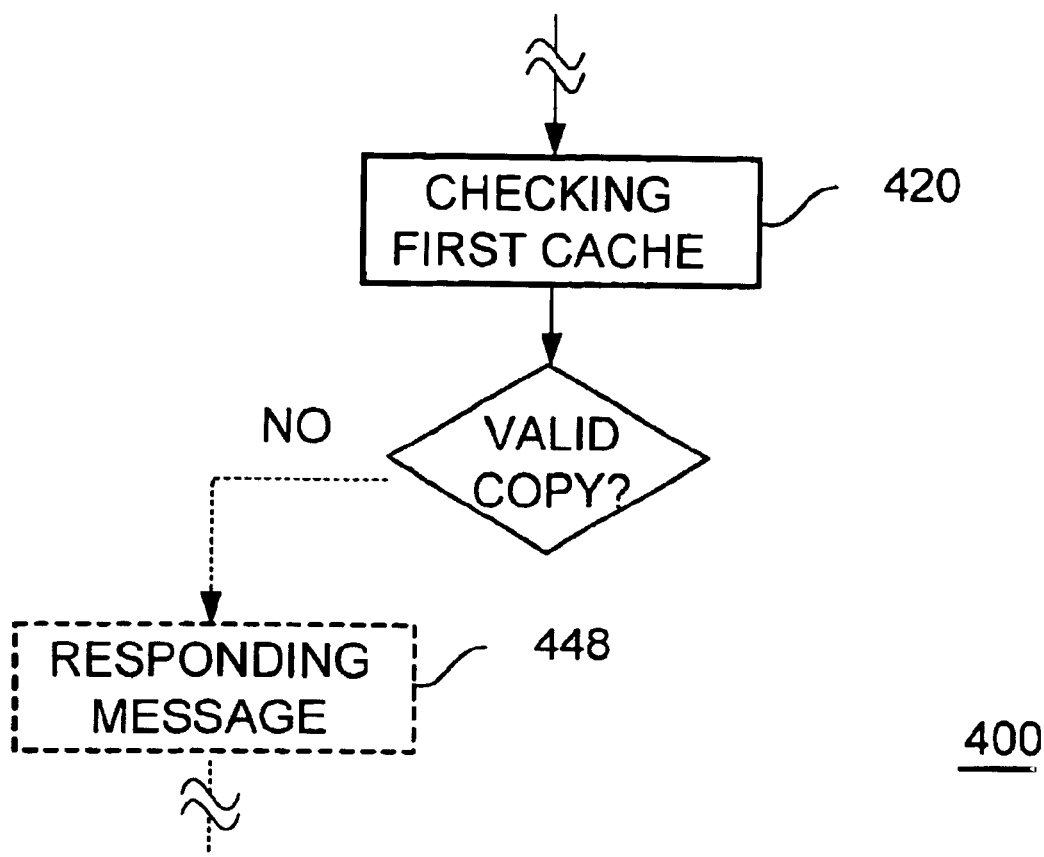
Figure 3C:
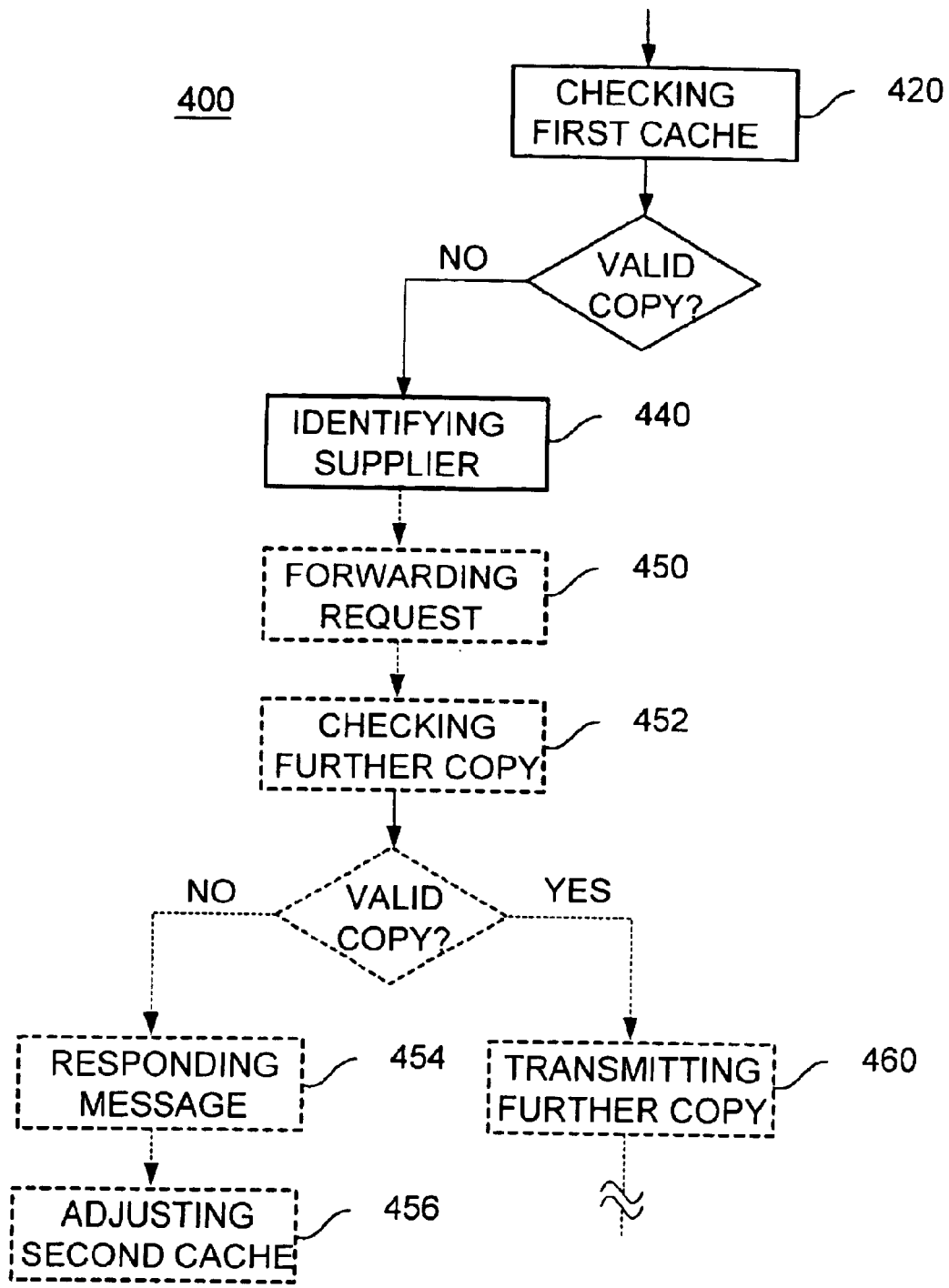

FIGS. 3A, 3B, 3C illustrate a process 400. Process 400 identifies a supplier computer for a requested object (e.g., OC3/01). Process 400 also allows the distribution of a copy (e.g., 190") of the requested object across multiple computers in network 10. Process 400 involves first computer 901 having first cache 921-1 and second computer 902 having second cache 922-1.

As shown in FIG. 3A, process 400 includes first computer 901 receiving (410) request 190-1 for object 190. The request 190-1 is launched by a user via an additional computer (not shown) in network 10 that serves as a client computer for the user.

The process 400 includes first computer 901 checking (420) first cache 921-1 for a copy (e.g., 190') of object 190. For example, request 190-1 has the format of an object key (OC3/01). First computer 901 scans first cache 921-1 and compares request 190-1 with object keys of objects 192, 193 (OC4/01, OC4/02).

If first cache 921-1 has a copy (190') of requested object 190, first computer 901 answers (430) the request 190-1 by sending the copy 190' to the requesting computer (e.g., the client computer of the user).

If first cache 921-1 does not have copy 190', process 400 includes first computer 901 identifying (440) second computer 902 as a supplier of copy 190" of object 190. First computer 901 uses first digest matrix 141 of first computer 901. Digest matrix 141 indicates that copy 190" is stored in second cache 922-1 of second computer 902 because content digest 141-22 for second computer 902 has a representation (OC3/01R) of object 190 (OC3/01).

Process 400 provides a solution to the problem of identifying a supplier of a requested object 190 within network 10. In an example, the supplier is a computer that can deliver a cached copy (e.g., 190") of the object 190 faster than the origin computer (e.g., OC3) can deliver the original object 190.

Process 400 allows network 10 to distribute a copy of the requested object 190 from supplying second computer 902 to requesting first computer 901, thus first computer 901 becoming a possible supplier.

Process 400 includes first computer 901 forwarding (450) request 190-1 to second computer 902 after having identified second computer 902 as a supplier, and second computer 902 retrieves copy 190" from second cache 922-1 and transmits (460) copy 190" to first cache 921-1. First computer 901 answers (465) the request 190-1 of the user by sending copy 190" to the corresponding requesting computer (e.g., the client computer of the user). In an example, first computer 901 stores copy 190" as copy 190' in first cache 921-1. First computer 901 updates (470) first digest matrix 141 according to first cache 921-1. That is, a representation (OC3/01R) of object 190 is added to content digest 141-12 because copy 190' was added to first content cache 921-1.

Second computer 902 receives updated first digest matrix 141 from first computer 901. Second computer 902 synchronizes (480) second digest matrix 142 with first digest matrix 141. In an example, content digests (e.g., 141-12) of first digest matrix 141 that refer to cache computers different from second computer 902 replace corresponding entries in second digest matrix 142. The second digest matrix entry referring to second computer 902 remains unchanged because second computer 902 knows the content of its own second cache 922-1. Second computer 902 does not allow other cache computers to update this information.

As shown in FIG. 3B, process 400 can include responding (448) after checking (420) in case no copy of requested object 190 is in first cache 921-1. First computer 901 then responds to request 190-1 with message 180. For example, message 180 indicates to the user that first computer 901 cannot immediately supply the requested object information.

As shown in FIG. 3C, process 400 can include the following to prevent second computer 902 from transmitting an obsolete copy of object 190 to first computer 901. Second computer 902 checks (452) the validity of copy 190" in second cache 922-1. If copy 190" is invalid (obsolete), process 400 responds (454) to request 190-1 of first computer 901 with message 180. For example, message 180 indicates that further copy 190" is obsolete. Second computer 902 then adjusts (456) second cache 922-1 by deleting obsolete copy 190".

There are various options for network 10 to react. For example, first computer 901 can identify via its digest matrix 141 another supplier. Then, process 400 is continued with the additional supplier playing the role of second computer 902. Alternatively, second computer 902 can play the role of first computer 901 in process 400 and use its own digest matrix 142 to identify the additional supplier. The additional supplier plays the role of second computer 902. Both alternatives can be repeated by network 10 until a valid copy of object 190 is retrieved from a cache within network 10. If no cached copy of requested object 190 is available in network 10, the network 10 retrieves original object 190 directly from the corresponding origin computer 903. The computer that retrieves object 190 from third computer 903 stores a copy of the object in its cache and updates its digest matrix accordingly.

Figure 4A:
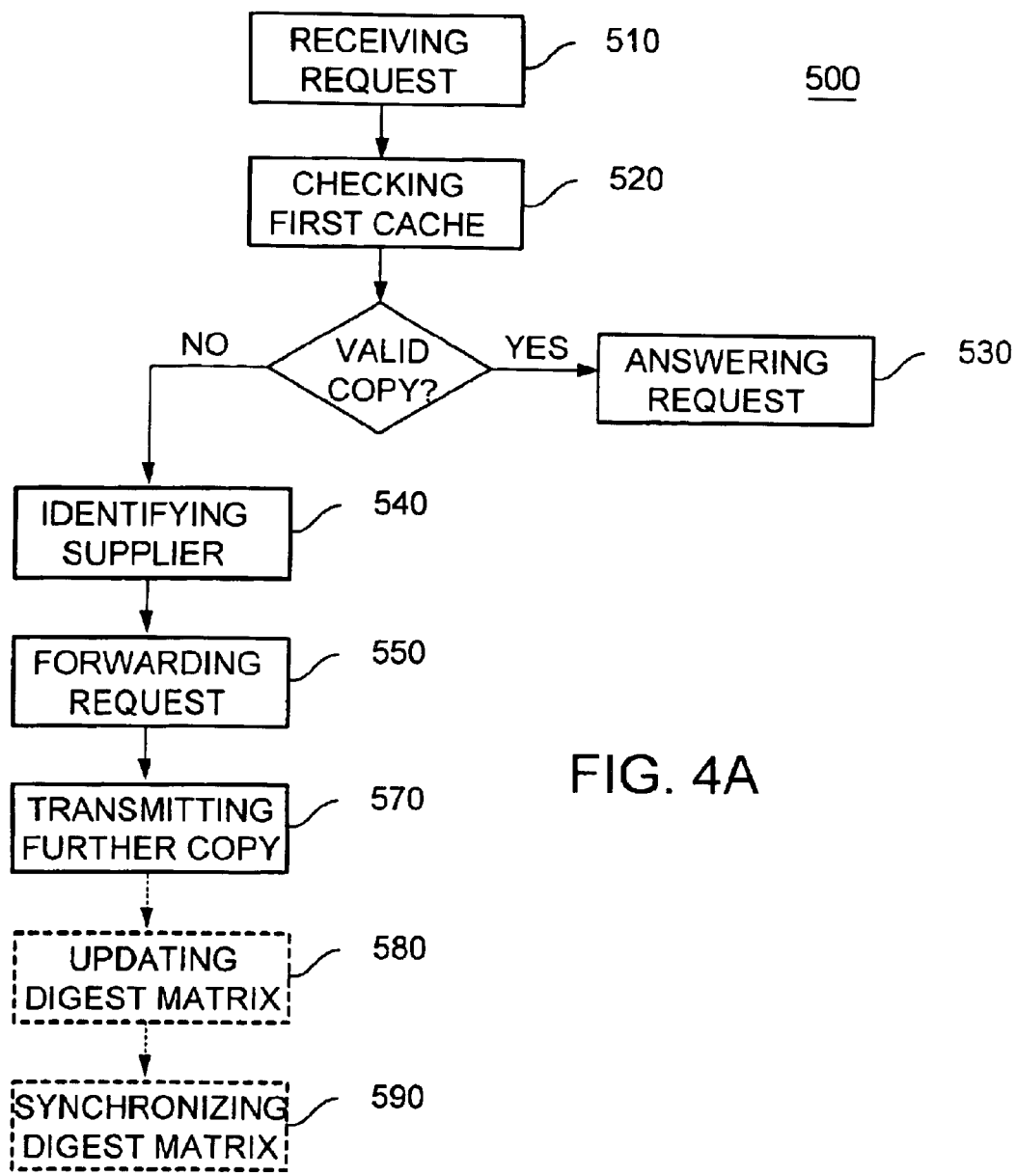
FIGS. 4A and 4B are flow diagram.
Figure 4B:
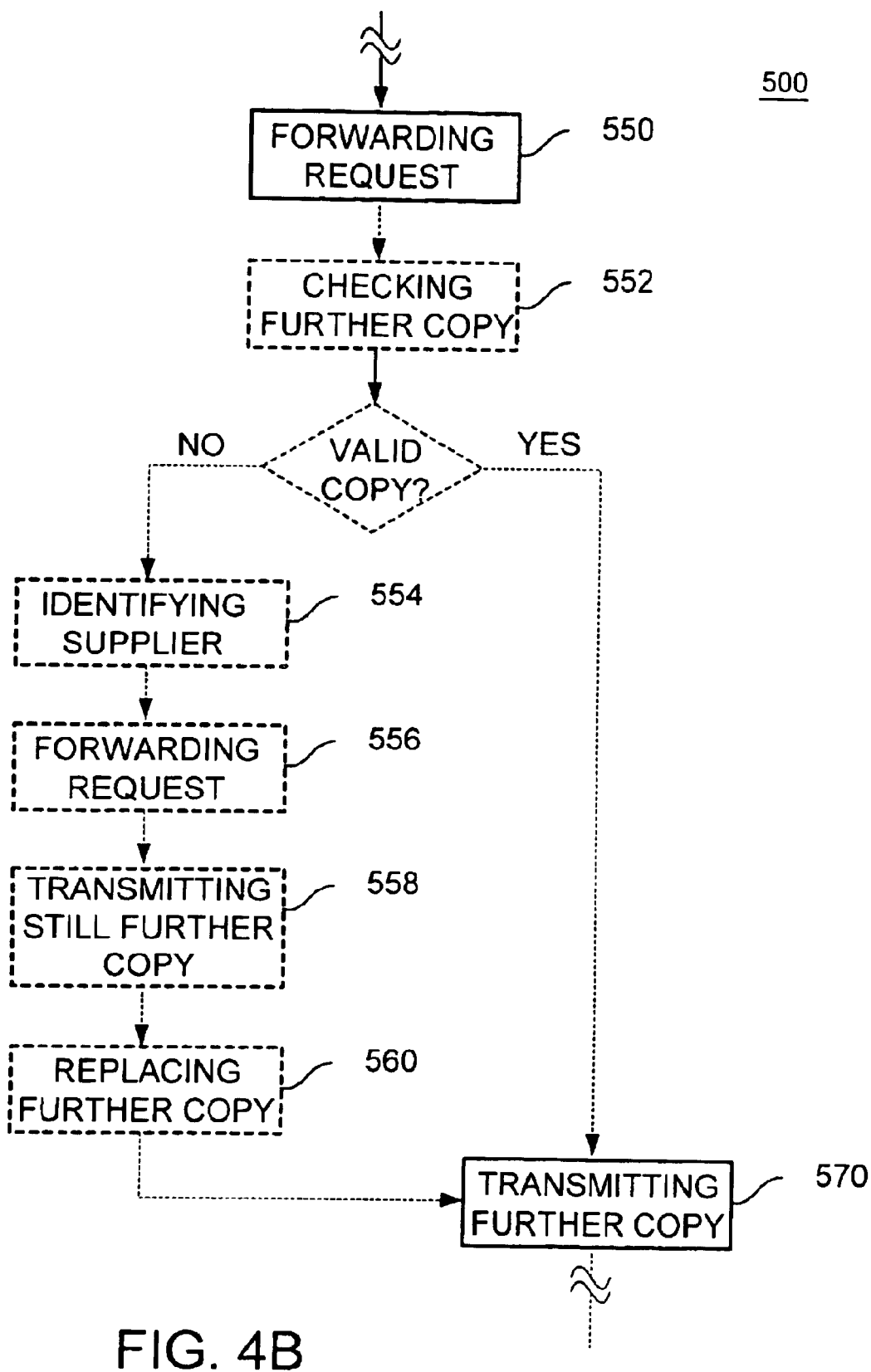

FIGS. 4A and 4B illustrate process 500 that is used for distributing a cached copy of a requested object from a supplying computer to a requesting computer. In FIG. 4A, elements labelled 510, 520, 530, 540, 550, 570, 580 and 590 correspond to elements labelled 410, 420, 430, 440, 450, 460, 470 and 480 of process 400, respectively.

As shown in FIG. 4B, if checking (552) determines that copy 190" in second cache 922-1 is invalid, second computer 902, identifies (554) computer 906 as supplier of copy 190'" of object 190. Second computer 902 uses digest matrix 142 of second computer 902 in a way that is equivalent to how first computer 901 uses its digest matrix 141. In the example, digest matrix 142 indicates that copy 190'" is stored in cache 926-1 of a further computer. Second computer 902 forwards (556) request 190-1 to the further computer, which transmits (558) copy 190'" from cache to second cache, thus answering request 190-1. Second computer 902 replaces (560) the value of obsolete further copy 190" with the value of copy 190'". Second computer 902 then transmits (570) copy 190" to first computer 901 to answer the original request 190-1 received by first computer 901.

Once a valid copy of requested object 190 is found on a computer, it is transmitted back to the computer that forwarded the request. In an example, the valid copy goes back the same path that request 190-1 used when being forwarded. An advantage is that any computer that was queried during the object search finally stores a valid copy of requested object 190 in its cache. A digest matrix of a requesting computer is synchronized with the digest matrix of the supplying computer after the valid copy was transmitted. Optionally, digest matrices of all computers can be synchronized with an independent synchronization mechanism (e.g., for example, at predefined time intervals).

Figure 5:
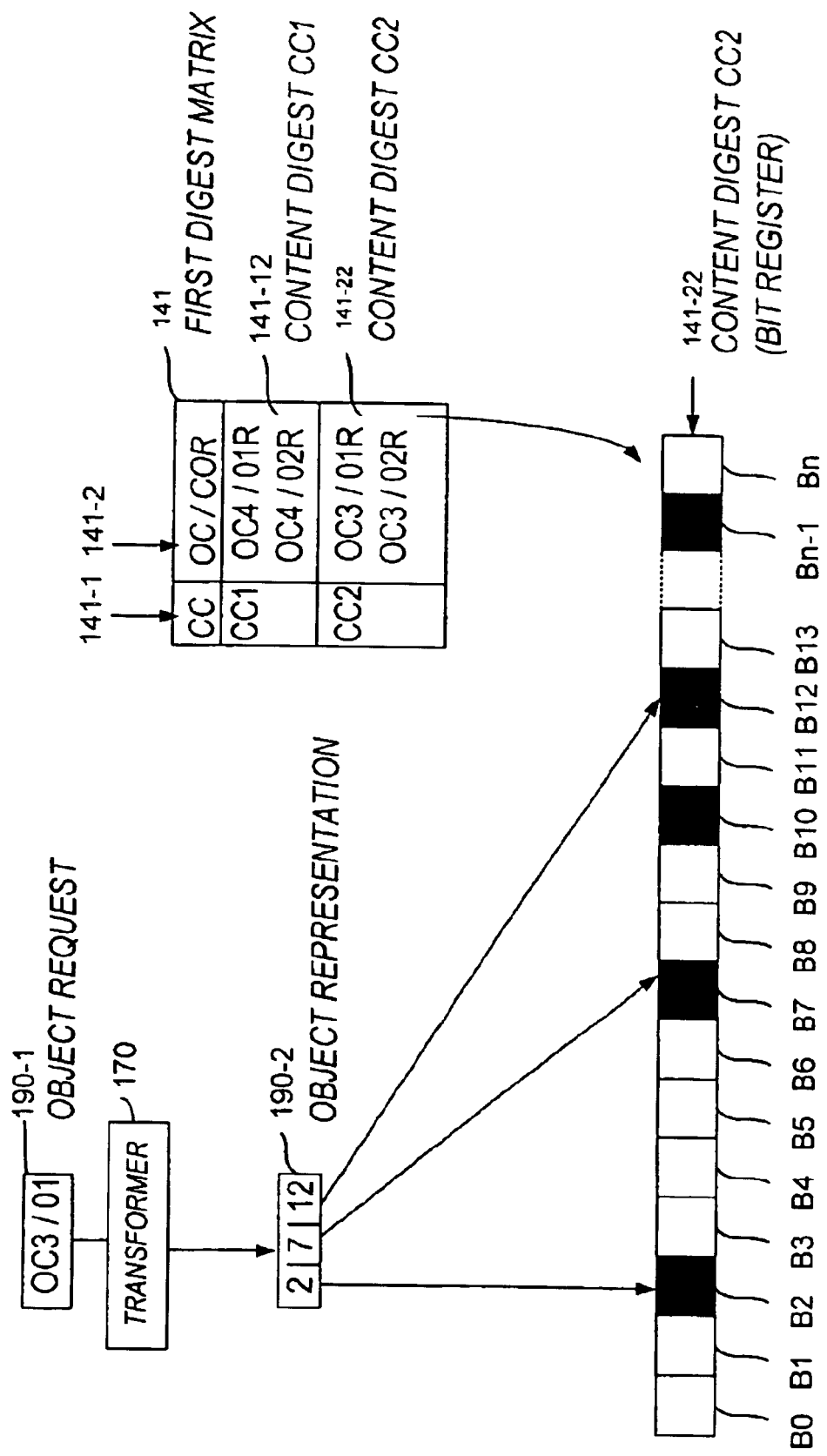
FIG. 5 illustrates a bit register.

As shown in FIG. 5, the first digest matrix 141 includes column 141-1 storing the IDs of cache computers and column 141-2 storing for each cache computer in network 10 a corresponding content digest 141-12, 141-22. For convenience of explanation, content digest 141-22 is used as an example to explain transforming and comparing object representations.

Content digest 141-22 includes representations (OC3/01R, OC3/02R) of objects 190', 191 (OC3/01, OC3/02), which are stored in second cache 922-1. Content digest 141-22 is shown as a bit register B0-Bn. Each object representation in content digest 141-22 corresponds to a bit pattern in the bit register B0-Bn. For example, object 190 corresponds to the bit pattern (B2, B7, B12). Bits that are turned on (e.g., bits having a logical "1") to form a bit pattern are grey shaded. In an example, bloom filters can be used to generate the content digest bit pattern for each object that is stored in the cache of the corresponding cache computer.

Transformer 170 of first computer 901 transforms request 190-1 for object 190 (e.g., object key OC3/01) into object representation 190-2. First computer 901 applies multiple transformations, such as hash-algorithms, to object request 190-1. The results of the transformations comply with the results of the bloom filters that are used to generate the content digest. For example, each hash algorithm results in a number that indicates a bit which is turned on in the bit register B0-Bn. In the example, three transformations are applied to object request 190-1 resulting in object representation 190-2. The result is a tupel (2,7,12). Object representation 190-2 indicates that second computer 902 is a possible supplier of object 190, because the corresponding bits B2, B7 and B12 of bit register B0-Bn are turned on.

An advantage of the scan is the compression of object representations in content digests. The compression saves bandwidth when cache computers synchronize their digest matrices because less data have to be exchanged between the cache computers when compared to an uncompressed content digest.

Figure 6A:
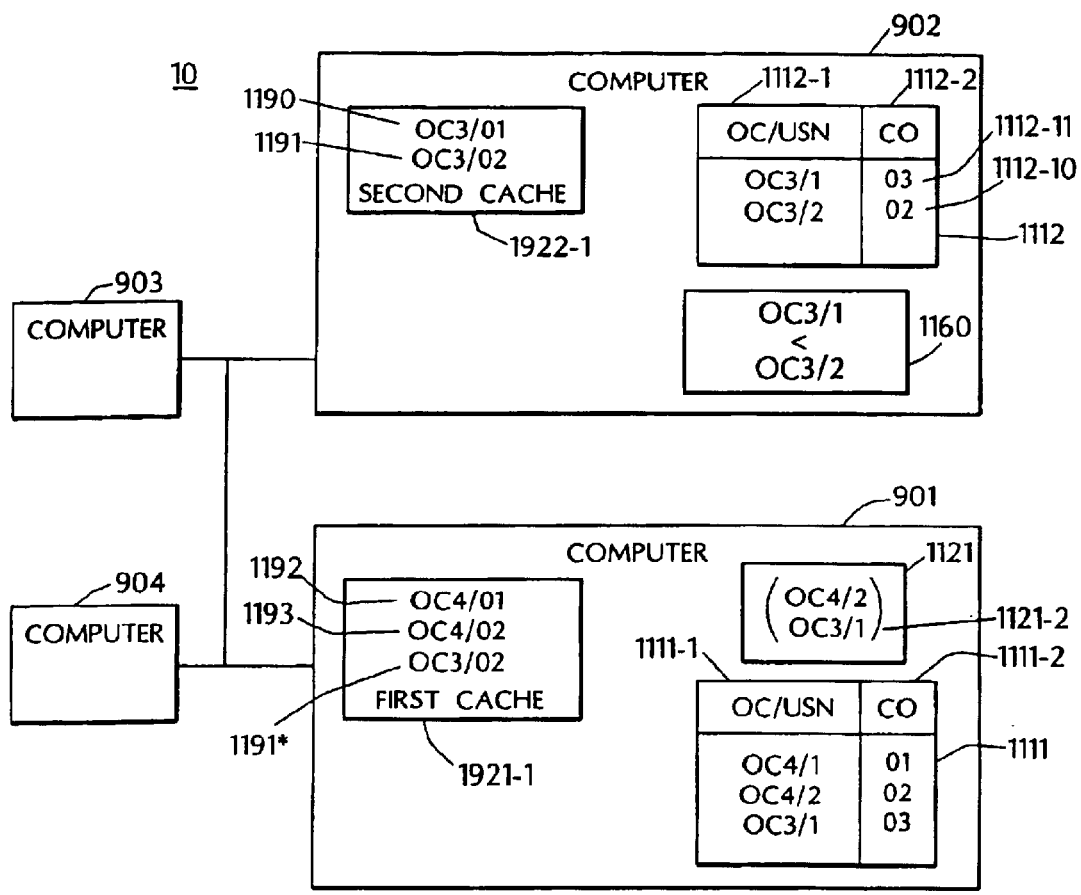
FIGS. 6A and 6B are block diagrams of a network.

As shown in FIG. 6A, network 10 includes computers 901, 902, 903, 904. First computer 901 and second computer 902 are cache computers. Third computer 903 and fourth computer 904 are origin computers.

First computer 901 has first cache 1921-1. First cache 1921-1 stores objects 1192, 1193 (OC4/01, OC4/02) originating in computer 904 and stores object 1191* (OC3/02) originating in third computer 903. Second computer 902 has second cache 1922-1. Second cache 1922-1 stores objects 1190, 1191 (OC3/01, OC3/02) originating in third computer 903.

First computer 901 stores first journal 1111. First journal 1111 includes all journal entries relating to object modifications on fourth computer 904. First journal 1111 further stores a journal entry (OC3/1) that corresponds to a modification of an object (03) on third computer 903. Second computer 902 stores second journal 1112. Second journal 1112 includes all journal entries 1112-10, 1112-11 relating to third computer 903. Optionally, computer 904 stores a journal (not shown) to track the change history of all objects of computer 904 and third computer 903 stores its own journal (not shown) to track the change history of all objects of third computer 903. The origin computer intermediately stores the journal entries and the cache computer loads new journal entries of the assigned origin computer at predefined time intervals. When a new journal entry for a specific object is generated, the new journal entry replaces an old journal entry for the specific object. Alternatively, new journal entries are appended to the corresponding journal.

For convenience of explanation, a data structure of a journal is explained by using second journal 1112 as an example. Second journal 1112 has two journal entries 1112-10, 1112-11 that both refer to third computer 903. Each journal entry has a key that includes an ID (OC) of the corresponding origin computer and an USN (e.g., 1). The key (e.g., OC3/1) is stored in column 1112-1 of journal 1112. Further, each journal entry includes an ID (e.g., 01) of the modified object (e.g., 01, 02) in column 1112-2. Journal 1111 includes columns 1111-1 and 1111-2 that is functionally equivalent to columns 1112-1 and 1112-2 respectively.

First computer 901 stores S-vector 1121. S-vector 1121 includes S-mark 1121-2. S-mark 1121-2 stores a representation (OC3/1) of a previous latest second journal entry 1112-11 at the time of the last synchronization between the two cache computers 901, 902. The value OC3/1 of S-mark 1121-2 indicates that the latest previous second journal entry has the key OC3/1. First computer 901 receives S-trigger 1986-1, which causes first computer 901 to synchronize with second computer 902. First computer 901 sends S-vector 1121 to second computer 902. Comparator 1160 of second computer 902 compares S-mark 1121-2 (OC3/1) with a comparable portion 1112-1 of second journal 1112. If second journal 1112 has a current latest journal entry 1112-10 referring to third computer 903 that is newer than previous latest second journal entry 1112-11, second computer 902 identifies each second journal entry 1112-10 that is newer than previous latest second journal entry 1112-11 and that refers to third computer 903. The key of current latest journal entry 1112-10 (OC3/2) originating from corresponding third computer 903 has an USN portion that is higher than the USN portion of the key of previous latest journal entry 1112-11 (2<1). Therefore, in the example, journal entry 1112-10 is identified.

In case of S-vector 1121 having multiple S-marks, second computer performs comparison with the identification of new journal entries referring to further origin computers for each S-mark.

Figure 6B:
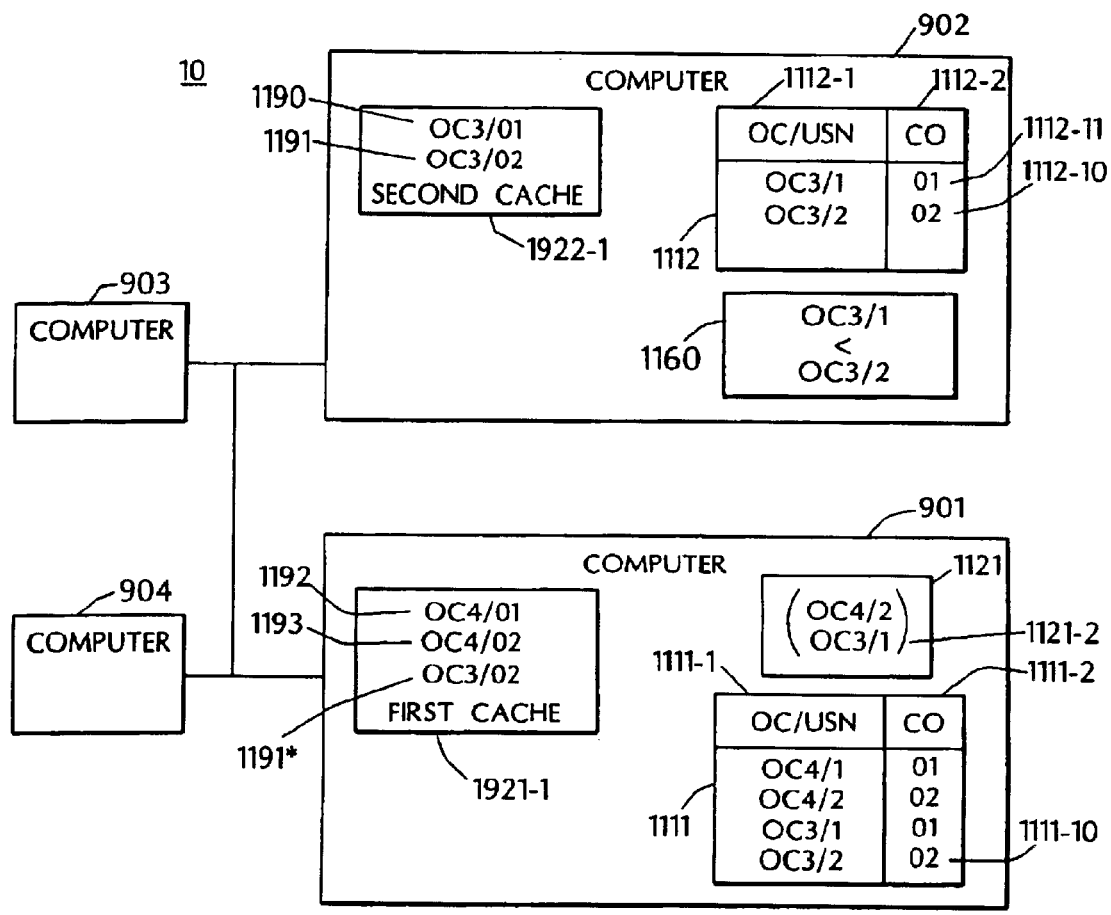

FIG. 6B illustrates network 10 after the cache adjustment of first cache 1921-1. Second computer 902 transmits identified second journal entry 112-10 (OC3/2) to first journal 1111, where it is added as first journal entry 1111-10.

First journal entry 1111-10 indicates that the original object OC3/02 that corresponds to object 1191* (OC3/02) was modified since object 1191* was loaded into first cache 1921-1. Therefore, object 1191* most likely is no longer consistent with the corresponding original object on third computer 903. As a consequence, first computer 901 adjusts first cache 1921-1 by deleting object 1191* in first cache 1921-1.

S-mark 1121-2 of S-vector 1121 is updated by replacing the old value (OC3/1) with a representation (e.g., the key) of the corresponding latest first journal entry 1111-10 (OC3/2), which is a copy of current latest second journal entry 1110-10.

The advantage of this cache adjustment mechanism is that the obsolete object (e.g., 1191*) does not exist anymore in first cache 1921-1. Now, first computer 901 knows the change history of all objects on third computer 903. In the case of S-vector 1121 including multiple S-marks, first computer 901 also knows the change history of objects on the corresponding origin computers. Further, S-vector 1121 stores at least S-mark 1121-2 on first computer 901. S-mark 1121-2 represents latest second journal entry 1112-10 and is comparable with, for example, a bookmark. When first computer 901 receives a further S-trigger and comparator 1160 identifies a need to transmit additional journal entries from second journal 1112 to first journal 1111, the bookmark is used to identify the additional journal entries. The additional journal entries have an USN portion higher than the USN portion of the bookmark.

Figure 7:
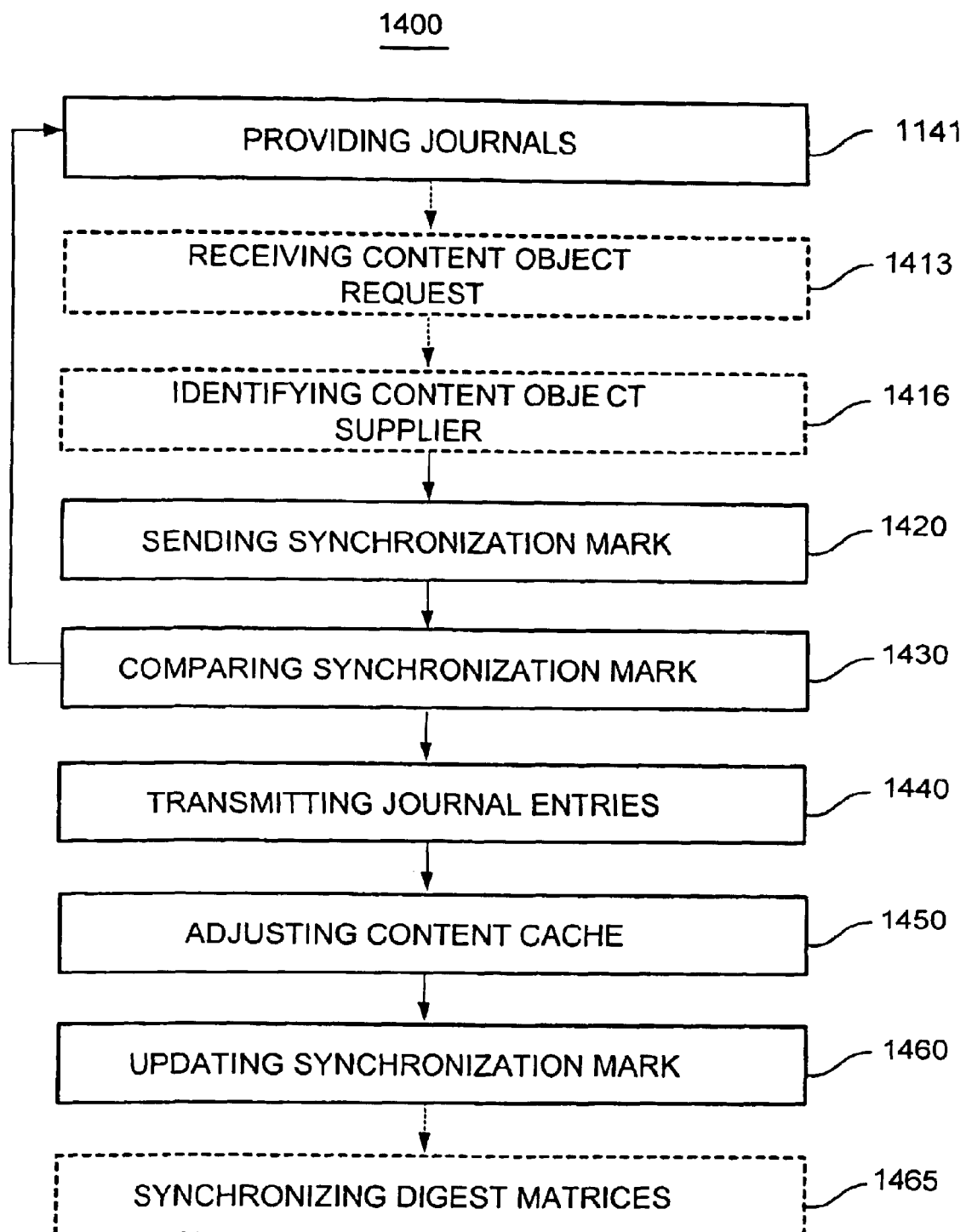
FIG. 7 is a flow diagram.

As shown in FIG. 7, a cache adjustment process 1400 includes providing journals (1410), sending synchronization vector (1420), comparing synchronization mark (1430), transmitting journal entries (1440), adjusting cache (1450) and updating synchronization vector (1460). Process 1400 may also include receiving object key (1413), identifying object supplier (1416) and synchronizing digest matrices (1465).

In the providing journals (1410), network 10 includes first computer 901 and second computer 902. First and second computers 901, 902 are cache computers. First computer 901 has first cache 1921-1 and provides first journal 1111. Second computer 902 has second cache 1922-1 and provides second journal 1112. First and second journals 1111, 1112 are tables that are stored in corresponding memories of first and second computers 901, 902, respectively. Journal entry 1112-10 of second journal 1112 indicates a modification of object 02 (column 1112-2 of journal entry 1112-10) on third computer 903. Journal entry 1112-10 has a unique key 1112-1 that includes the ID of third computer 903 and an USN (2). Third computer 903 creates a journal entry with a new USN for an object (e.g., 02) in second journal 1112, each time the object is changed (e.g., modified, deleted). The USNs referring to an origin computer are generated as increasing or decreasing numbers over time.

In the sending synchronization mark (1420), first computer 901, sends S-vector 1121 to second computer 902 caused by S-trigger 1986-1. S-vector 1121 includes S-mark 1121-2. S-mark 1121-2 stores a representation (e.g., the key) of the previous latest second journal entry (OC3/1) with respect to third computer 903 at the time of the last synchronization between first and second computers 901, 902. In case that no synchronization occurred, an initial value (e.g., OC3/0) is assigned to S-mark 1121-2.

In the comparing synchronization mark (1430), comparator 1160 of second computer 902 compares S-mark 1121-2 (OC3/1) with a comparable portion 1112-1 of second journal 1112. If second journal 1112 has a current latest journal entry 1112-10 referring to third computer 903 that is newer than previous latest second journal entry 1112-11, second computer 902 identifies each second journal entry 1112-10 that is newer than previous latest second journal entry 1112-11 and that refers to third computer 903. In case no such current latest journal entry 1112-10 exists, process 1400 waits for the next S-trigger to restart. The key of current latest journal entry 1112-10 (OC3/2) originating from corresponding third computer 903 has an USN portion that is higher than the USN portion of the key of previous latest journal entry 1112-11 (2<1). Therefore, journal entry 1112-10 is identified. This indicates that object 1190 (OC3/02) of third computer 903 was modified since the last synchronization between first and second computers 901, 902. The result of the comparing (1430) is a list of all journal entries (e.g., 1112-10) of second journal 1112 that refer to third computer 903 and were generated since the last synchronization between first and second computer 901, 902. Comparator 1160 considers all journal entries that were generated by third computer 903 within a predefined time interval prior to S-trigger 1986-1. Typically, a time interval is defined in a way that journal entries that were generated outside the time interval are outdated. The comparing synchronization (1430) is repeated for all S-marks stored in S-vector 1121.

In transmitting journal entries (1440), second computer 902 transmits the list of journal entries resulting from the comparison (1430) to first journal 1111. Journal entry 1112-10 (OC3/2) of second journal 1112 is transmitted to first journal 1111, where it is added as journal entry 1111-10. First journal 1111 has now synchronized with second journal 1112. That is, first computer 901 has the same knowledge as second computer 902 about the status of objects of at least third computer 903.

In adjusting cache (1450), first computer 901 uses the information of new journal entries (e.g., 1111-10) in first journal 1111 to adjust first cache 1921-1. Journal entry 1111-10 indicates that the original object OC3/02 that corresponds to object 1191* (OC3/02) was modified since object 1191* was loaded into first cache 1921-1. Therefore, object 1191* most likely is no longer consistent with the corresponding original object on third computer 903. As a consequence, first computer 901 adjusts (1450) first cache 1921-1 by deleting object 1191* from first cache 1921-1.

In updating (1460), first computer 901 updates on first computer 901 at least S-mark 1121-2 of S-vector 1121 with the key of current latest journal entry 1111-10 (OC3/2) and referring to third computer 903. Updated S-mark 1121-2 serves as a bookmark for second journal 1112 when the next S-trigger occurs.

Optionally, in providing journals (1410), first computer 901 further provides first digest matrix and second computer 902 provides second digest matrix. First digest matrix of first computer 901 stores for each cache computer a content digest of the corresponding cache computer.

In receiving object request (1413), first computer 901 receives request for object, preferably in the form of an object key. Requested object is not available in first cache of first computer 901.

In the identifying object supplier (1416), first computer 901 identifies second computer 902 as a supplier of object. To achieve this, first computer 901 transforms object key into representation of object. First computer 901 compares object representation with content digests of first digest matrix. Content digest of second computer 902 includes a representation of object. This indicates that object is stored in second cache of second computer 902. Therefore, second computer 902 is identified as a possible supplier of object. There can be more than one supplier for the same object. First computer 901 identifies the supplier that is found first in first digest matrix.

Optionally, in sending synchronization mark (1420), first computer 901 further sends object request 1190-1 to the identified second computer 902.

Optionally, in transmitting journal entries (1440), second computer 902 further transmits object to first cache. First cache now includes object (OC3/01), which is a consistent copy of object.

Optionally, in updating synchronization mark (1460), first computer 901 further updates first digest matrix by adding a representation (OC3/01R) of object to content digest. First digest matrix now indicates that object OC3/01 is available in the caches of first computer 901 and second computer 902.

In the optional synchronizing digest matrices (1465), first computer 901 sends first digest matrix to second computer 902. Second computer 902 synchronizes second digest matrix with first digest matrix. Second computer 902 replaces the content of second digest matrix with the content of first digest matrix with the exception of content digest. Each cache computer is responsible for the correctness of its own content digest and, preferably, does not update its own content digest when synchronizing its digest matrix with a further cache computer. After the synchronizing (1465), second computer 902 also knows that object OC3/01 is available in the caches of first computer 901 and second computer 902.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented for use with a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

A number of embodiments of the invention have been described. Nevertheless, it will be understood that various modifications can be made without departing from the spirit and scope of the invention. Accordingly, other embodiments are within the scope of the following claims.

What is claimed is:

1. A computer-implemented method involving a first computer having a cache and at least a second computer; the method comprising:

providing a first journal on the first computer, a second journal on the second computer, a first digest matrix of the first computer and a second digest matrix of the second computer, wherein at least one second journal entry indicates a previous modification of an object on a third computer;

sending from the first computer to the second computer at least a representation of a previous latest second journal entry referring to the third computer;

comparing the at least one representation with a comparable portion of the second journal;

if a current latest second journal entry referring to the third computer is newer than the previous latest second journal entry, transmitting from the second journal to the first journal at least each second journal entry that is newer than the previous latest second journal entry and that refers to the third computer;

adjusting the cache according to the first journal;

updating the at least one representation on the first computer according to the first journal;

receiving a request for an object on the first computer; and identifying via the first digest matrix the second computer as a supplier of the object.

2. The method of claim 1, wherein the sending further comprises delivering the request for the object from the first computer to the second computer.

3. The method of claim 2, wherein the second computer uses a further cache and transmitting further comprises sending the object from the further cache to the cache of the first computer.

4. The method of claim 3 wherein updating includes the first digest matrix.

5. The method of claim 4 further comprising synchronizing the first digest matrix with the second digest matrix.

6. A method comprising:

in a network of computers, providing a first journal in a first computer, a second journal in the second computer, a first digest matrix of the first computer and a second digest matrix of the second computer, the second journal entry indicating a previous modification of an object on a third computer;

sending from the first computer to the second computer a representation of a previous latest second journal entry;

comparing the representation with a comparable portion of the second journal;

if a current latest second journal entry referring to the third computer is newer than the previous latest second journal entry, transmitting from the second journal to the first journal the second journal entry that is newer than the previous latest second journal entry;

adjusting a cache in the first computer according to the first journal;

updating the representation on the first computer according to the first journal;

receiving a request for an object on the first computer; and identifying via the first digest matrix the second computer as a supplier of the object.

7. The method of claim 6 in which sending further comprises delivering the request for the object from the first computer to the second computer.

8. The method of claim 7 in which updating includes the first digest matrix.

9. The method of claim 8 further comprising synchronizing the first digest matrix with the second digest matrix.

10. A computer program product, tangibly embodied in an information carrier, the computer program product being operable to cause data processing apparatus to do the following:

provide a first journal on a first computer, a second journal on a second computer, a first digest matrix of the first computer and a second digest matrix of the second computer, wherein at least one second journal entry indicates a previous modification of an object on a third computer;

send from the first computer to the second computer at least a representation of a previous latest second journal entry referring to the third computer;

compare the at least one representation with a comparable portion of the second journal;

if a current latest second journal entry referring to the third computer is newer than the previous latest second journal entry, transmit from the second journal to the first journal at least each second journal entry that is newer than the previous latest second journal entry and that refers to the third computer;

adjust a cache of the first computer according to the first journal;

update the at least one representation on the first computer according to the first journal;

receive a request for an object on the first computer; and identify via the first digest matrix the second computer as a supplier of the object.

11. The computer program product of claim 10 further comprising deliver the request for the object from the first computer to the second computer.

12. The computer program product of claim 11 further comprising use a further cache and send the object from the further cache to the cache of the first computer.

13. The computer program product of claim 12 further comprising synchronize the first digest matrix with the second digest matrix.

14. A computer program product, tangibly embodied in an information carrier, the computer program product being operable to cause data processing apparatus to do the following:

in a network of computers, provide a first journal in a first computer, a second journal in the second computer, a first digest matrix of the first computer and a second digest matrix of the second computer, the second journal entry indicating a previous modification of an object on a third computer;

send from the first computer to the second computer a representation of a previous latest second journal entry;

compare the representation with a comparable portion of the second journal;

if a current latest second journal entry referring to the third computer is newer than the previous latest second journal entry, transmit from the second journal to the first journal the second journal entry that is newer than the previous latest second journal entry;

adjust a cache in the first computer according to the first journal;

update the representation on the first computer according to the first journal;

receive a request for an object on the first computer; and identify via the first digest matrix the second computer as a supplier of the object.

15. The computer program product of claim 14 further comprising deliver the request for the object from the first computer to the second computer.

16. The computer program product of claim 15 further comprising use a further cache and send the object from the further cache to the cache of the first computer.

17. The computer program product of claim 16 further comprising synchronize the first digest matrix with the second digest matrix.

* * * * *

UNITED STATES PATENT AND TRADEMARK OFFICE
CERTIFICATE OF CORRECTION

PATENT NO. : 6,820,114 B2
DATED : November 16, 2004
INVENTOR(S) : Brendle

It is certified that error appears in the above-identified patent and that said Letters Patent is hereby corrected as shown below:

Title page,
Item [*] Notice, should read
-- [*] Notice:  Subject to any disclaimer, the term of this patent is extended or adjusted under 35 U.S.C. 154(b) by 231 days. --

Signed and Sealed this

Seventeenth Day of May, 2005

JON W. DUDAS
*Director of the United States Patent and Trademark Office*